(12) United States Patent
Yoshida

(10) Patent No.: US 10,486,924 B2
(45) Date of Patent: Nov. 26, 2019

(54) IMAGE READING APPARATUS HAVING RAIL MEMBER TO RETAIN GUIDE MEMBER TO BE SLIDABLE

(71) Applicant: CANON KABUSHIKI KAISHA, Tokyo (JP)

(72) Inventor: Tsuyoshi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/166,674

(22) Filed: Oct. 22, 2018

(65) Prior Publication Data

US 2019/0127165 A1 May 2, 2019

(30) Foreign Application Priority Data

Oct. 31, 2017 (JP) ................................ 2017-210531

(51) Int. Cl.
| | |
|---|---|
| *H04N 1/04* | (2006.01) |
| *B65H 5/06* | (2006.01) |
| *H04N 1/00* | (2006.01) |
| *B65H 5/36* | (2006.01) |
| *H04N 1/10* | (2006.01) |
| *B65H 7/20* | (2006.01) |

(52) U.S. Cl.
CPC .............. *B65H 5/062* (2013.01); *B65H 5/36* (2013.01); *B65H 7/20* (2013.01); *H04N 1/00551* (2013.01); *H04N 1/00588* (2013.01); *H04N 1/00615* (2013.01); *H04N 1/00814* (2013.01); *H04N 1/10* (2013.01); *B65H 2404/611* (2013.01); *B65H 2511/20* (2013.01); *B65H 2513/50* (2013.01); *B65H 2553/82* (2013.01); *B65H 2701/1311* (2013.01); *B65H 2801/06* (2013.01); *B65H 2801/39* (2013.01); *H04N 1/00538* (2013.01)

(58) Field of Classification Search
CPC ........... H04N 1/00588; H04N 1/00615; H04N 1/00814; H04N 1/10; H04N 1/00538; B65H 5/062; B65H 5/36
USPC ......................................... 358/498, 1.1, 474
See application file for complete search history.

(56) References Cited

U.S. PATENT DOCUMENTS

| | | | | |
|---|---|---|---|---|
| 5,280,330 A | * | 1/1994 | Baba | ...................... G03G 15/60 355/75 |
| 2018/0224789 A1 | * | 8/2018 | Endo | ................... G03G 15/6508 |

FOREIGN PATENT DOCUMENTS

JP          2002278174 A       9/2002

* cited by examiner

*Primary Examiner* — Douglas Q Tran
(74) *Attorney, Agent, or Firm* — Canon U.S.A., Inc. IP Division

(57) ABSTRACT

An image reading apparatus includes a document platen on which a document is to be stacked, a pressing sheet having flexibility, a conveyance unit provided in a base member, an open portion provided in the base member and rotatable in a first direction with respect to the base member to open at least a part of the conveyance path, and a rotation member rotatable in the first direction with respect to the base member. The pressing sheet presses the document against the document platen. The conveyance unit forms a conveyance path within which the document is to be conveyed. The reading unit reads the document conveyed by the conveyance unit. The open portion retains one end of the pressing sheet in a longitudinal direction. The rotation member retains the other end of the pressing sheet in the longitudinal direction.

12 Claims, 8 Drawing Sheets

IMAGE READING APPARATUS HAVING RAIL MEMBER TO RETAIN GUIDE MEMBER TO BE SLIDABLE

BACKGROUND OF THE INVENTION

Field of the Invention

The present disclosure relates to an image reading apparatus and a recording apparatus.

Description of the Related Art

An ADF (Automatic Document Feeder) disclosed in Japanese Patent Laid-Open No. 2002-278174 is capable of reading by a sheet-through method in which image reading is performed by a reading unit that is fixed while a document is conveyed and reading by a document-fixed reading method in which a document is placed on a contact glass and image reading is performed by moving a reading unit. In the ADF, a pressure plate (sheet) that presses a document against the contact glass is constituted by a resin white sheet and a sponge sheet that have elasticity.

In the ADF, the pressure plate is often attached to a guide plate that is used to open a conveyance path of a document to perform document jam processing or clean an inner part. In Japanese Patent Laid-Open No. 2002-278174, since the pressure plate is attached to an attachment portion that is provided in the guide plate and is slidable, the guide plate and the pressure plate slide when a user opens the guide plate to open the conveyance path, thus suppressing forcible bending of the pressure plate.

In a configuration of Japanese Patent Laid-Open No. 2002-278174, however, a space needs to be provided in the guide plate for sliding of the pressure plate in a width direction of an apparatus and increase in a size of the apparatus in the width direction is caused.

SUMMARY OF THE INVENTION

The disclosure provides an image reading apparatus capable of opening a conveyance path of a document while suppressing increase in a size of the apparatus in a width direction. According to an aspect of the present disclosure, an image reading apparatus includes a document platen on which a document is to be stacked, a pressing sheet having flexibility and configured to press the document against the document platen, a conveyance unit provided in a base member and configured to form a conveyance path within which the document is to be conveyed, a reading unit configured to read the document conveyed by the conveyance unit, an open portion provided in the base member, in which the open portion is rotatable in a first direction with respect to the base member to open at least a part of the conveyance path and is configured to retain one end of the pressing sheet in a longitudinal direction, and a rotation member configured to retain the other end of the pressing sheet in the longitudinal direction and rotatable in the first direction with respect to the base member.

Further features of the present disclosure will become apparent from the following description of embodiments with reference to the attached drawings.

DESCRIPTION OF THE EMBODIMENTS

The disclosure is applicable to a reading apparatus (document reading apparatus) that includes an automatic document feeder (ADF) and reads a document by using an image sensor (reading unit). The disclosure is also applicable to, in addition to the reading apparatus, a recording apparatus that has a recording function of recording an image together with a reading function. An example of the recording apparatus includes a multifunction apparatus (multifunction peripheral) also having other functions, such as a FAX function, in addition to a printing function (recording function). Further, the disclosure is also applicable to a recording apparatus that has a recording function of recording an image on a recording medium instead of the reading function. In such a case, not a document but a recording medium on which an image is to be recorded is stacked on a feeding tray, a recording unit is provided instead of a reading unit in a conveyance path, and the image is recorded by the recording unit on the recording medium that is conveyed.

Figure 1:
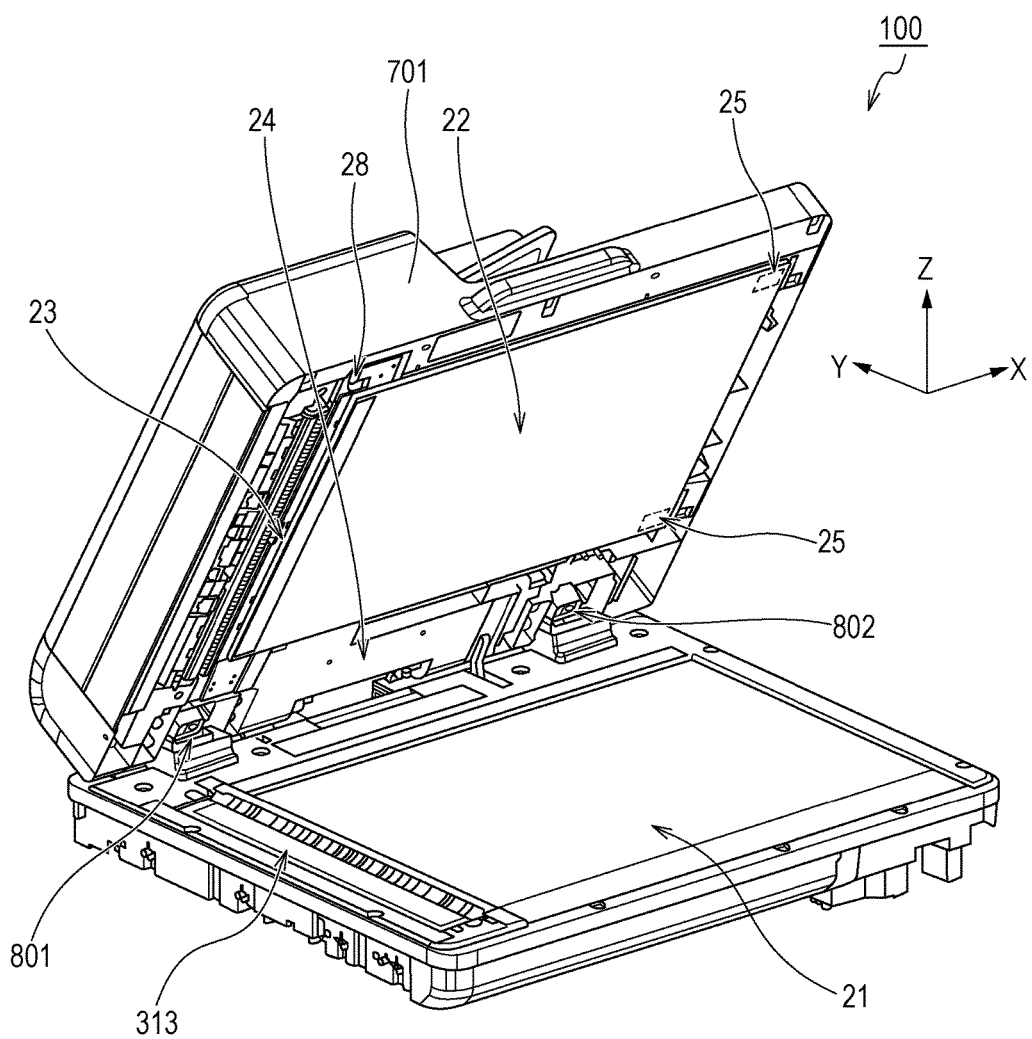
FIG. 1 is a perspective view illustrating an outer appearance of an image reading apparatus.

FIG. 1 is a perspective view illustrating an outer appearance of an image reading apparatus 100. The image reading apparatus 100 may be arranged, for example, on a recording apparatus including a recording unit. The image reading apparatus 100 includes a document platen unit 313 provided with a document platen glass 21 on which a document is able to be stacked, and an ADF 701 that is able to be opened or closed with hinges 801 and 802 with respect to the document platen unit 313. The hinge 801 and the hinge 802 are arranged away from each other at right and left in an X direction illustrated in FIG. 1 and are arranged in a back side (downstream side in a Y direction) of the apparatus. FIG. 1 illustrates a state where the ADF 701 is opened with respect to the document platen unit 313.

Figure 8:
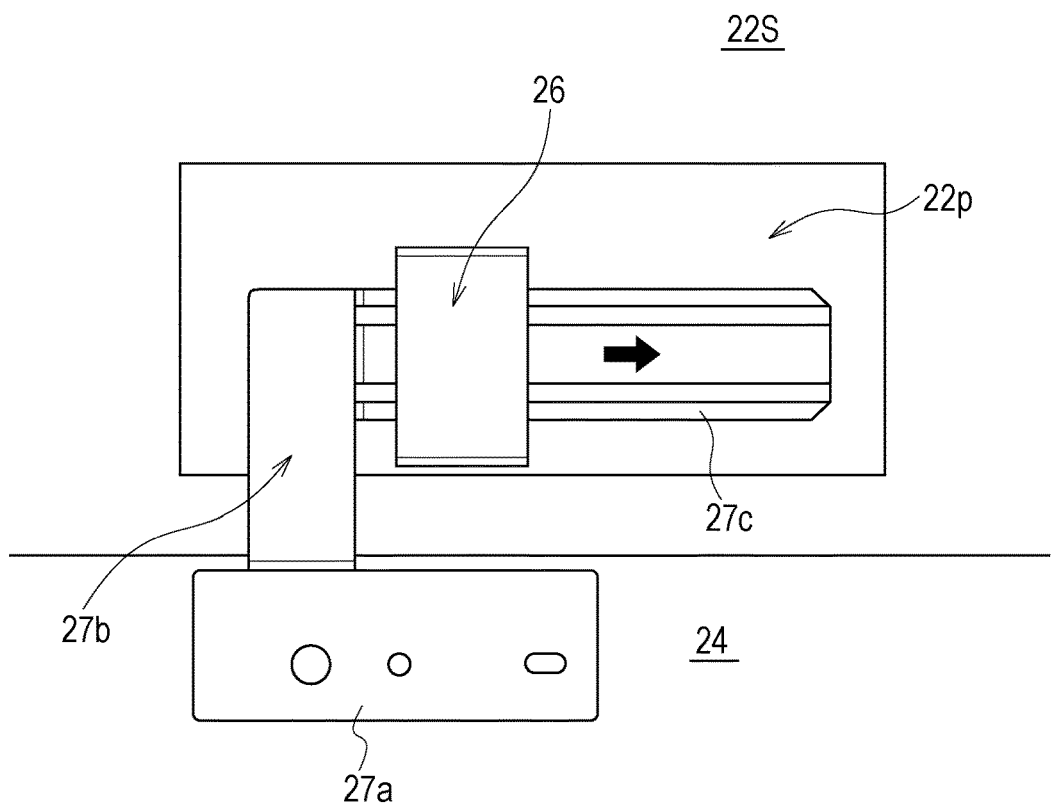
FIG. 8 is a top perspective view obtained by enlarging a vicinity of a guide member of the image reading apparatus.

On a surface of the ADF 701, which faces the document platen unit 313, a base member 24 is arranged. The base member 24 is provided with a pressing sheet 22 that presses a document against the document platen glass 21 when the document is read, an open portion 23 to which one end of the pressing sheet 22 is attached, and a rotation member 25 to which the other end of the pressing sheet 22 is attached. In the present embodiment, two rotation members 25 are provided at two ends, but the number of rotation members 25 is not limited thereto. The pressing sheet 22 that has flexibility is constituted by a resin white sheet 22p and a sponge sheet 22s that have elasticity. The resin white sheet 22p is arranged on a surface facing the document platen glass 21 and the sponge sheet 22s is arranged on a surface attached to the base member 24 (FIG. 8). The base member 24 is also provided with a regulating member 28 capable of regulating rotation of the open portion 23.

Note that, hereinafter, the X direction, the Y direction, and a Z direction respectively indicate a width direction (or longitudinal direction of the pressing sheet 22), a depth direction (or transverse direction of the pressing sheet 22), and a height (vertical) direction of the image reading apparatus 100. In a case where the image reading apparatus 100 is seen from a front surface to use the apparatus, an upstream side in the X direction corresponds to a left side of the apparatus and a downstream side corresponds to a right side of the apparatus. Moreover, an upstream side and the downstream side in the Y direction respectively correspond to a front (front surface) side and a back (rear surface) side when the image reading apparatus 100 is used.

Figure 2:
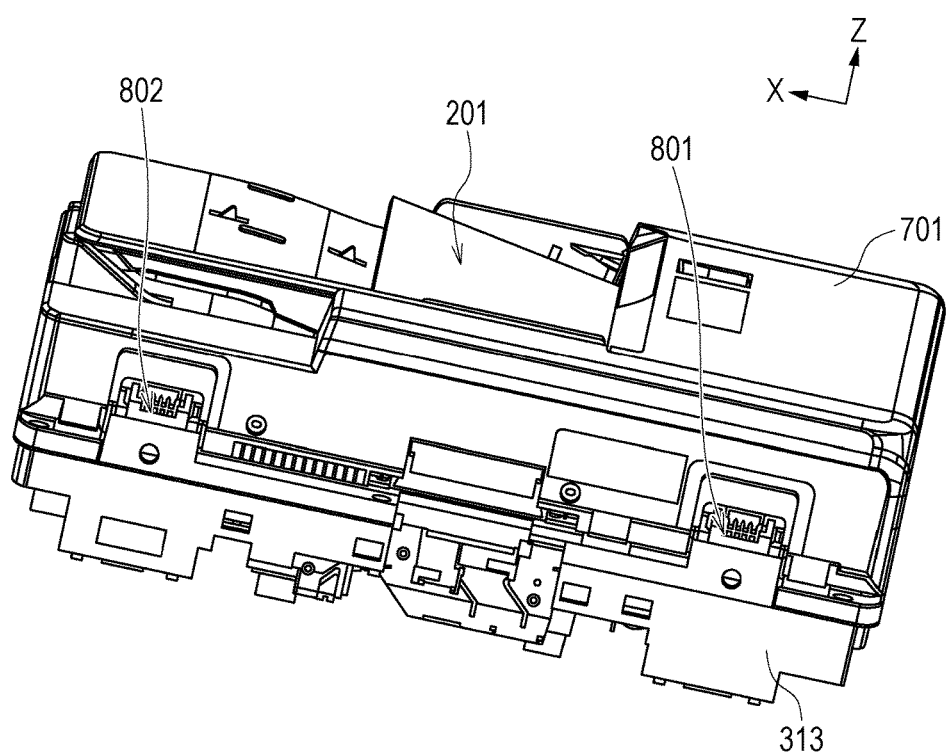
FIG. 2 is a side view of an ADF of the image reading apparatus as viewed from an apparatus rear surface side.

FIG. 2 is a side perspective view of the ADF 701 as viewed from the downstream side in the Y direction, that is, the rear surface side of the image reading apparatus 100, Since the hinges 801 and 802 are provided on the rear surface side of the apparatus, a user is able to perform an open or close operation of the ADF 701 on the front side of the apparatus. Each of the hinges 801 and 802 has a rotational axis and a damper mechanism, Axial directions of the two rotational axes are the same directions (X directions). In each of the hinges 801 and 802, one hinge component is fixed to the base member 24 and the other is fixed to the document platen unit 313.

Figure 3:
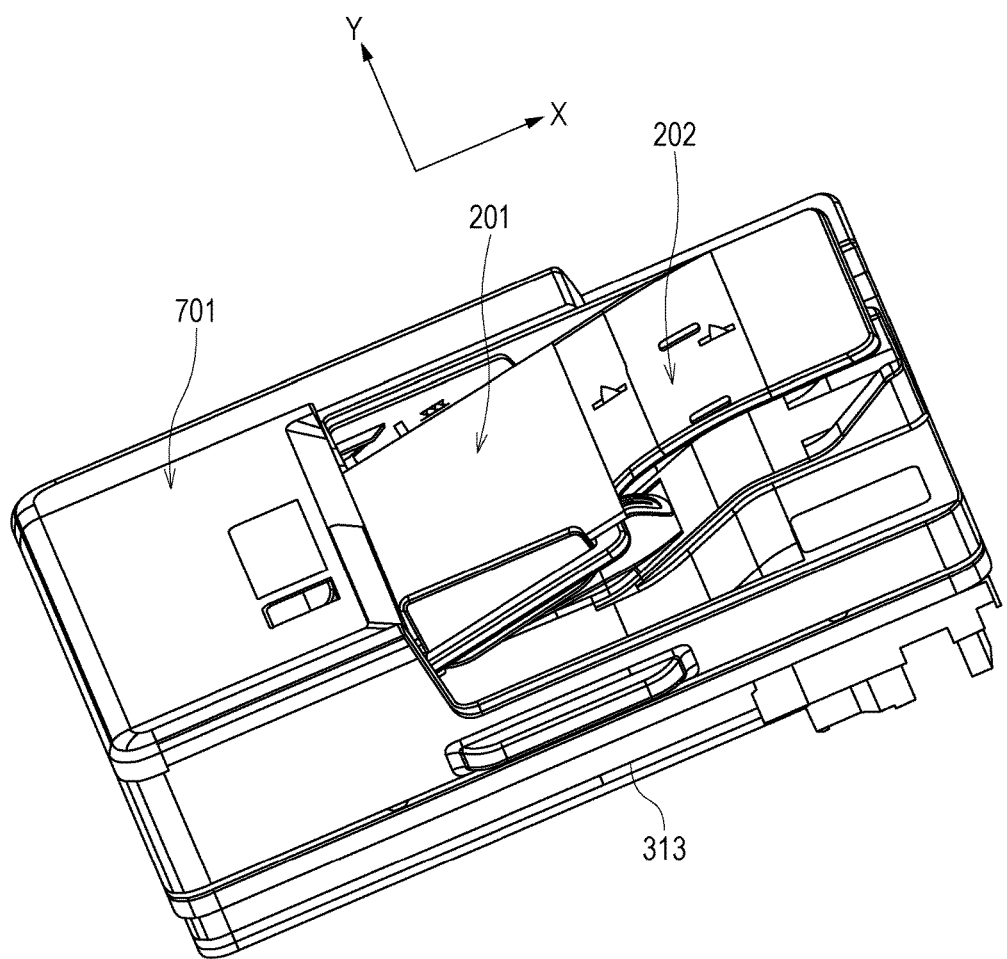
FIG. 3 is a top perspective view of the ADF of the image reading apparatus.

FIG. 3 is a top perspective view illustrating an outer appearance of the ADF 701 as viewed from above. A document tray 202 is provided on a top surface of the ADF 701 and a document 201 is set on the document tray 202 by the user.

Figure 4:
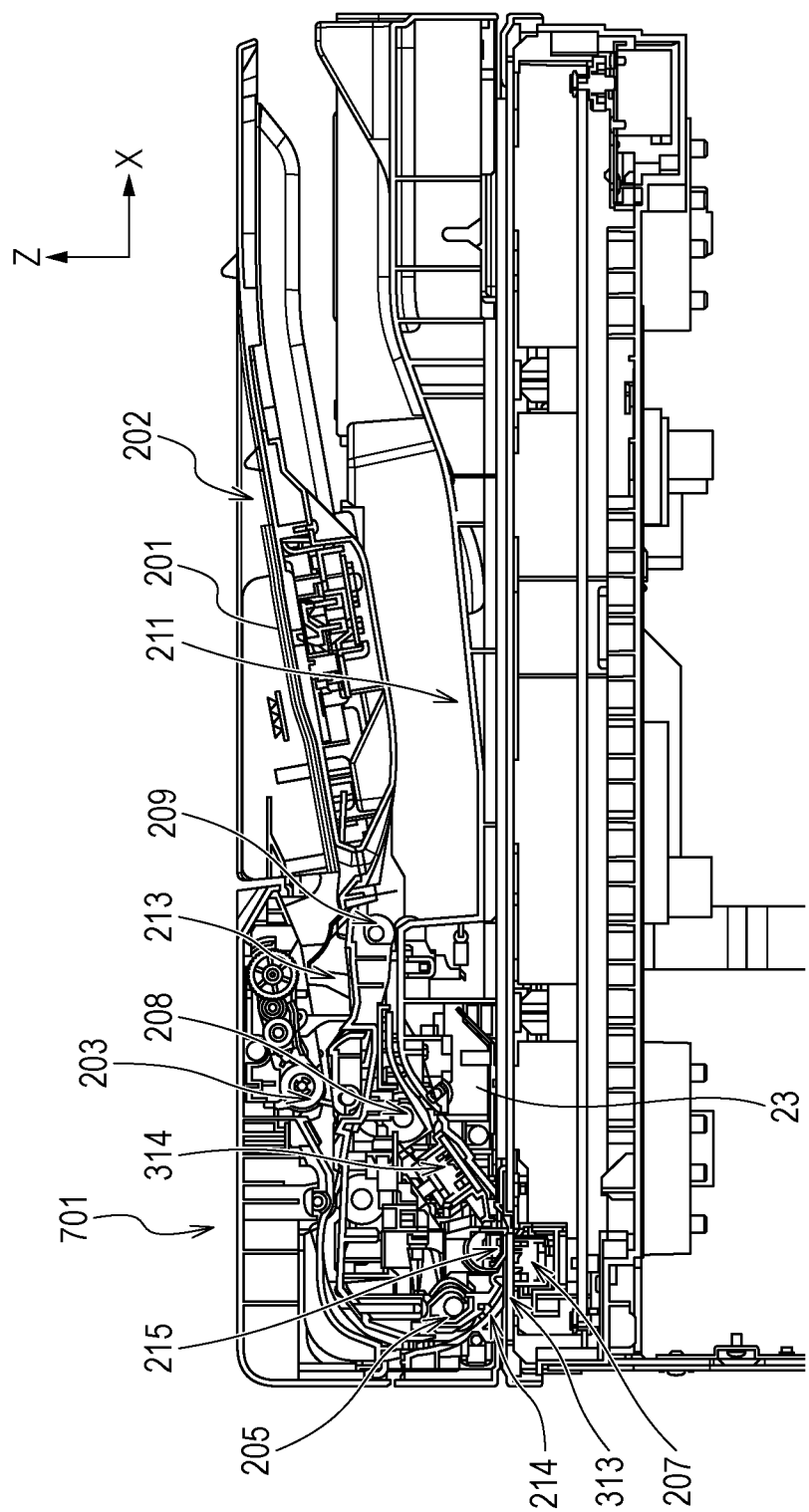
FIG. 4 is a sectional view of the ADF of the image reading apparatus as viewed from an apparatus front side.

FIG. 4 is a sectional view illustrating an inner structure of the ADF 701 when the image reading apparatus 100 is viewed from the front side. The ADF 701 has a conveyance path in which a document is conveyed and the conveyance path has a U-turn path in which the document 201 that is conveyed is reversely turned in a U-turn. That is, the document 201 that is set on the document tray 202 is conveyed to the upstream side in the X direction, and then reversed in a U-shape and conveyed toward the downstream side in the X direction, and discharged to a discharge tray 211 provided underneath the document tray 202.

The ADF 701 includes a document detection sensor 213 that detects presence or absence of the document 201 set on the document tray 202 and an edge sensor 214 that detects a leading edge of the document 201 and decides timing of reading. A separation roller 203 is provided near a feeding port of the ADF 701 and separates the document 201 stacked on the document tray 202 one by one for feeding. On the conveyance path, a first conveyance roller 205 and a second conveyance roller 208 serving as conveyance units that convey the document 201 are arranged, and a discharge roller 209 that discharges the document 201 is provided near a discharge port. These rollers are rotatable by a driving source (not illustrated), After a first surface of the document 201 that is conveyed by the respective rollers is read by a first reading sensor (reading unit) 207, a second surface thereof is read by a second reading sensor (reading unit) 314. Note that, the first reading sensor 207 is provided in the document platen unit 313 and the second reading sensor 314 is provided in the ADF 701.

A reading operation (sheet-through reading method) of the document 201 by the ADF 701 will be described in detail below. When the document 201 is set on the document tray 202 by the user, the document 201 is detected by the document detection sensor 213. After that, in accordance with an instruction to start the reading operation, the document 201 is separated and conveyed by the separation roller 203 and reversed in the U-turn path. After the document 201 is reversed, when the leading edge thereof is detected by the edge sensor 214 while the document 201 is being conveyed by the first conveyance roller 205, the document 201 is delivered to a space between a conveyance guide member 215 and a document platen glass 21 provided in the document platen unit 313. The conveyance guide member 215 has a function of pressing the document 201 against the document platen unit 313 by an elastic mechanism to thereby improve accuracy of reading.

When the leading edge of the document 201 is detected by the edge sensor 214 and the document 201 is then conveyed until a step count of the driving source reaches a predetermined number, the leading edge of the document 201 reaches the first reading sensor 207 and the first surface is read in accordance with conveyance by the first conveyance roller 205. The first surface at this time corresponds to an upper surface when the document 201 is set on the document tray 202.

When the document 201 conveyed downstream of the conveyance guide member 215 is conveyed along the open portion 23 until the step count of the driving source reaches a predetermined number after reading in the first reading sensor 207 starts, a second surface is read by the second reading sensor 314. Here, the second surface is a surface of a back side of the first surface and corresponds to a lower surface when the document 201 is set on the document tray 202.

When a trailing edge of the document 201 is detected by the edge sensor 214 and the document 201 is conveyed until the step count of the driving source reaches a predetermined number, reading by the first reading sensor 207 is finished, and then, reading by the second reading sensor 314 is finished. The document 201 that has passed through the second reading sensor 314 passes through the second conveyance roller 208 and the discharge roller 209 and is discharged to the discharge tray 211. In this manner, through the step count of the driving source, distances from the leading and trailing edges of the document 201 to the first reading sensor 207 and the second reading sensor 314 are acquired, so that timing of conveyance of the document 201 by the respective rollers is matched with timing of reading.

Next, a reading operation of the ADF 701 by a fixed reading method of the document 201 will be described. In the fixed reading method, the document 201 does not move, and an image is read while a reading sensor moves. Specifically, the first reading sensor 207 arranged on the document platen unit 313 moves in the X direction along a lower surface of the document platen glass 21, and an image of the lower surface of the document 201 that is stacked on the document platen glass 21 is thereby read.

Figure 5:
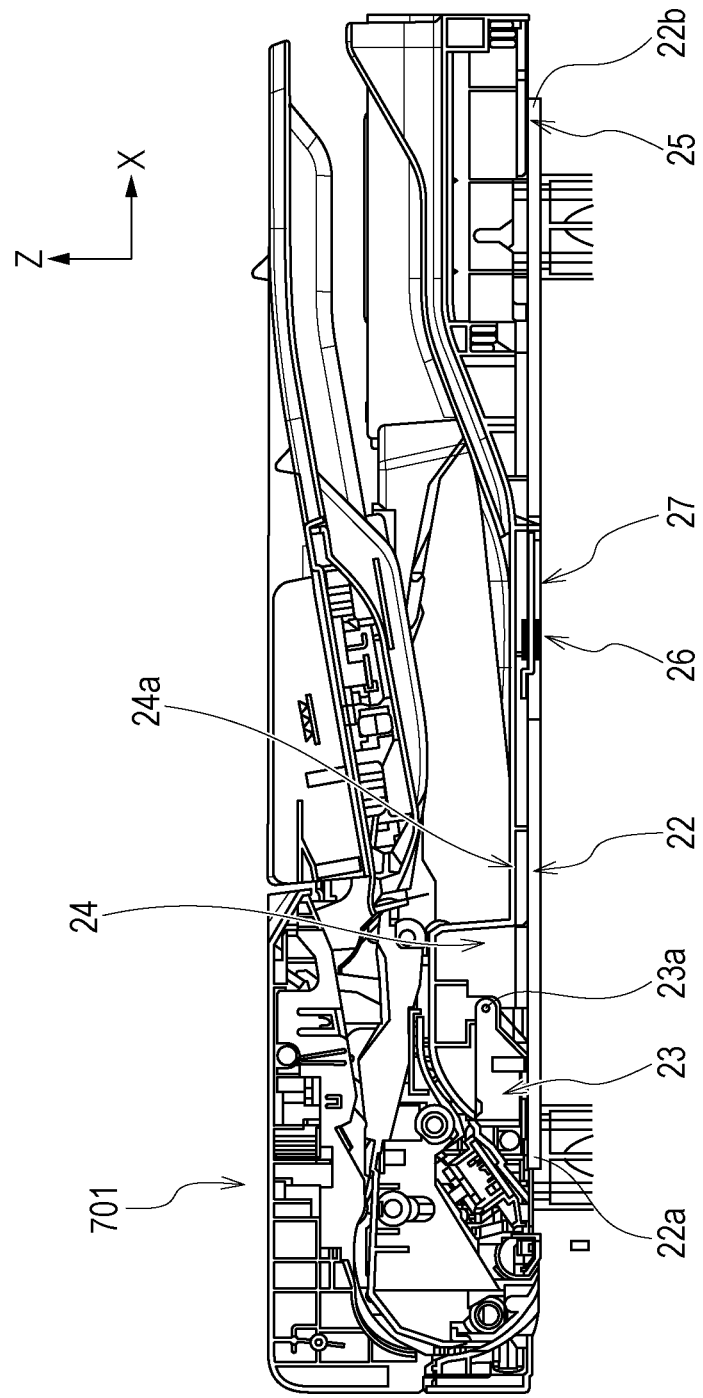
FIG. 5 is a sectional view illustrating a state where a pressing sheet of the image reading apparatus is closed.
Figure 6:
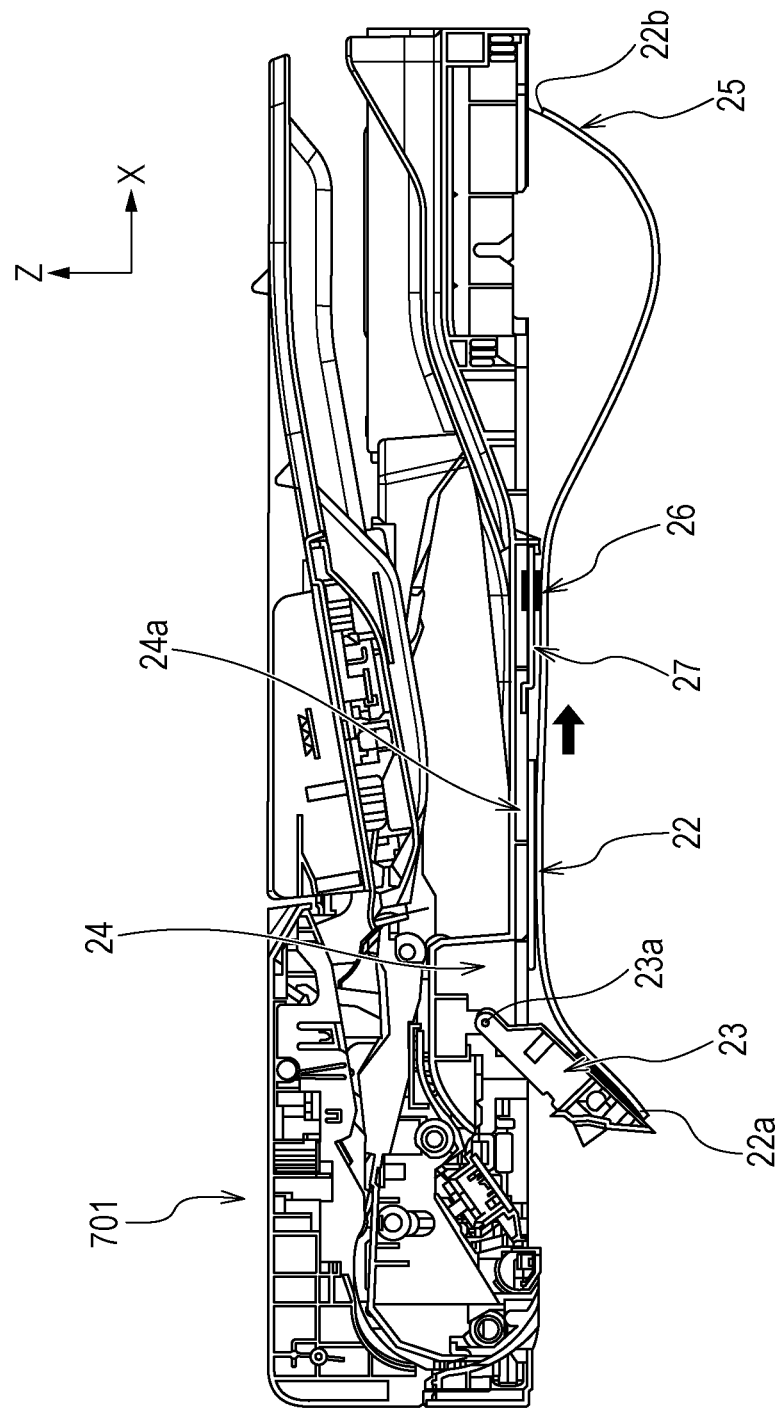
FIG. 6 is a sectional view illustrating a state where the pressing sheet of the image reading apparatus is opened.

FIGS. 5 and 6 are schematic sectional views illustrating an inner structure of the ADF 701 when the image reading apparatus 100 is viewed from the front side and are obtained by partially simplifying FIG. 4. FIG. 5 illustrates a state where the open portion 23 is closed and FIG. 6 illustrates a state where the open portion 23 is opened. As described above, the open portion 23 forms a part of the conveyance path of the document 201 in the sheet-through reading method, and is attached to the base member 24 so as to be rotatable in a counterclockwise manner about a shaft 23a. Since one end (end 22a) of the pressing sheet 22 in the X direction is fixed to the open portion 23, the end 22a rotates with the open portion 23 and moves in a vertically downward direction as illustrated in FIG. 6.

The rotation of the open portion 23 is regulated by the regulating member 28 (FIG. 1) provided in the base member 24. When the regulating member 28 is at a regulating position, the rotation of the open portion 23 is regulated, and when the regulating member 28 is at a releasing position, the open portion 23 is rotatable.

Figure 7A:
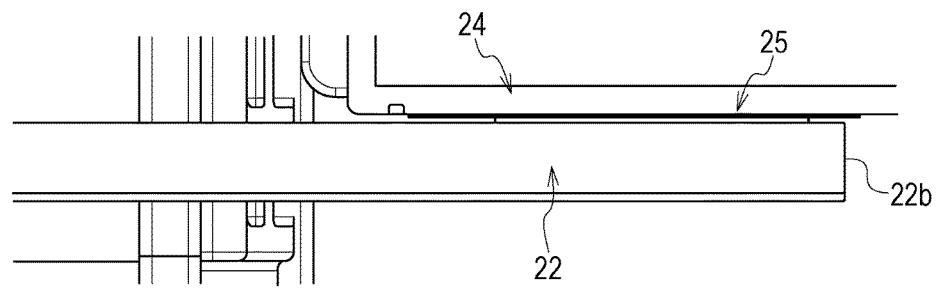
FIGS. 7A and 7B are schematic sectional views obtained by enlarging a vicinity of a rotation member of the image reading apparatus.
Figure 7B:
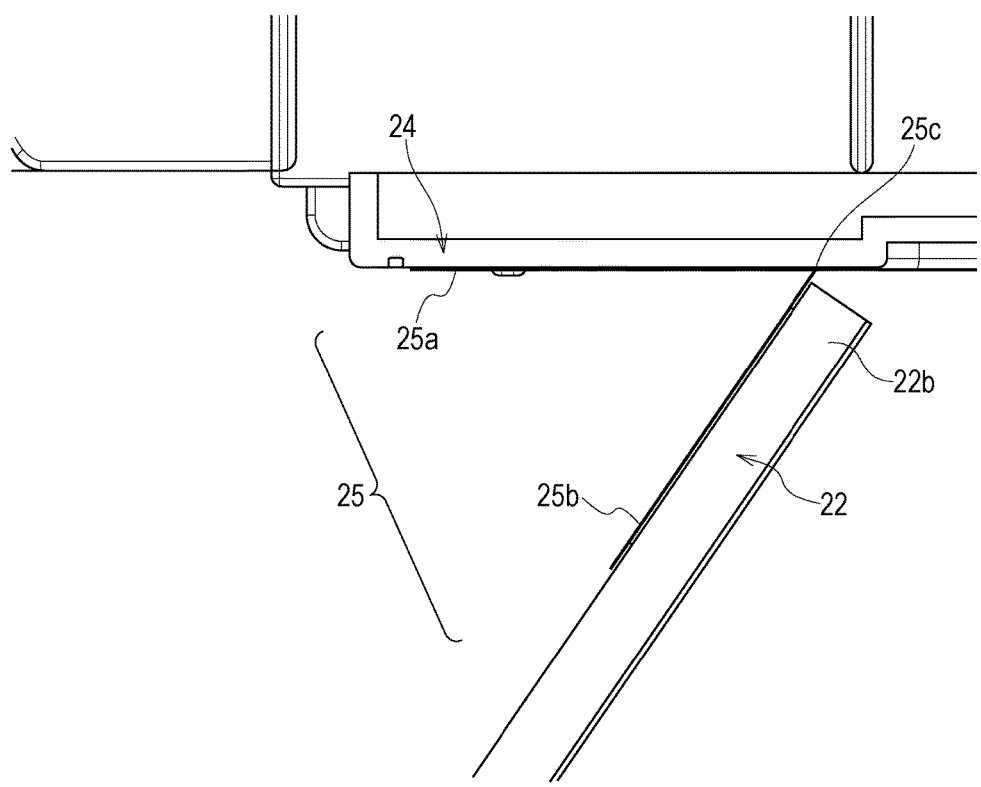

The other end (end 22b) of the pressing sheet 22 in the X direction is fixed to the two rotation members 25. In a state where the ADF 701 is closed, the rotation members 25 are provided at both ends of the pressing sheet 22 in the Y direction as illustrated in FIG. 1. FIGS. 7A and 7B are schematic side views obtained by enlarging a vicinity of a rotation member 25 in FIGS. 5 and 6. FIG. 7A illustrates a state where the rotation member 25 is closed and corresponds to FIG. 5, and FIG. 7B illustrates a state where the rotation member 25 is opened and corresponds to FIG. 6. As illustrated in FIG. 7B, the rotation member 25 has a hinge shape that is rotatable about a rotational shaft 25c, and a first surface 25a is fixed to the base member 24 and a second surface 25b is fixed to a vicinity of the end 22b of the pressing sheet 22. The rotation member 25 is rotatable in a counterclockwise manner about the rotational shaft 25c, similarly to the open portion 23.

A guide member 26 is provided near a center of the pressing sheet 22 in the X direction and on the apparatus front side (upstream side in the Y direction). The base member 24 is provided with a rail member 27 including a rail on which the guide member 26 is slidable. FIG. 8 is an enlarged view of the guide member 26 and the rail member 27 perspectively seen from above.

The pressing sheet 22 is constituted by the resin white sheet 22p and the sponge sheet 22s as described above and the guide member 26 is attached to a side of the pressing sheet 22, which faces the base member 24. In the present embodiment, a part of the sponge sheet 22s, which corresponds to an area where the guide member 26 is provided and slides on the rail member 27, is cut out. The resin white sheet 22p is exposed from the part that is cut out in the sponge sheet 22s, and the guide member 26 is attached to the exposed resin white sheet 22p and is thereby fixed.

The rail member 27 is a member in which an attachment portion 27a, a connection portion 27b, and a rail portion 27c are integrally formed in a U-shape and is provided in the base member 24. The attachment portion 27a is attached to the base member 24 by a screw or the like and the rail portion 27c forms the rail on which the guide member 26 is slidable. The connection portion 27b connects the attachment portion 27a and the rail portion 27c. The guide member 26 is formed so as to have an opening corresponding to a rail shape of the rail portion 27c, and an opening in a rectangular shape is provided in the present embodiment. A configuration is such that the guide member 26 is fitted with the rail portion 27c along a direction of an arrow illustrated in FIG. 8 in assembling so that the guide member 6 is slidable.

Note that, when the pressing sheet 22 and a peripheral member thereof are assembled, first, the ends of the pressing sheet 22 in the X direction are attached to the open portion 23 and the rotation members 25. At this time, the guide member 26 has been already attached to the pressing sheet 22. Thereafter, in a state where the open portion 23 is temporarily opened, the rail member 27 is passed through the opening of the guide member 26, and then, the rail member 27 is attached to the base member 24 by a screw or the like.

As a result, one end (end 22a) of the pressing sheet 22 in the X direction is attached to the open portion 23 and the other end (end 22b) thereof is attached at two places where the rotation members 25 are arranged. In a vicinity of the center of the pressing sheet 22 in the X direction, the guide member 26 is retained so as to be slidable on the rail member 27. That is, the pressing sheet 22 is configured so that both ends and the vicinity of the center in the X direction are partially retained by the base member 24. Thereby, the pressing sheet 22 of the present embodiment is configured so as to have a shape changeable by conforming to a shape of the document 201, compared to a configuration in which a whole of the pressing sheet 22 is attached to the base member 24 and fixed. Therefore, the pressing sheet 22 is able to press the document 201 against the document platen glass 21 reliably; thus making it possible to improve accuracy of reading.

With reference back to FIGS. 5 and 6, motion of the respective members when the open portion 23 is opened will be described. When the user moves the regulating member 28 to the releasing position to release regulation, the open portion 23 rotates in a counterclockwise manner about the shaft 23a. Thereby, a part of the conveyance path in the ADF 701 is exposed and opened, and the user is able to access the conveyance path to perform jam processing or maintenance.

Since the end 22a of the pressing sheet 22 also moves in the downstream side in the X direction with the rotation of the open portion 23, the whole of the pressing sheet 22 also moves in the downstream side in the X direction. In order to correspond to such movement, the guide member 26 slides on the rail member 27 to the downstream side (arrow direction illustrated in FIG. 6) in the X direction. With the movement of the pressing sheet 22 that moves upon the sliding of the guide member 26, the end 22b rotates about the rotational shaft 25c with the rotation members 25. As a result, the pressing sheet 22 between the guide member 26 and the end 22b is bent in a loop shape. By the bending, an amount of the movement of the pressing sheet 22 in the X direction when the open portion 23 is opened is absorbed.

In the present embodiment, since the rotation members 25 are provided partially in the Y direction, it is possible to reduce force required to rotate the rotation members 25. Thus, even when force that is caused by rotation of the open portion 23 to move the pressing sheet 22 in the downstream side in the X direction is small, the rotation members 25 easily rotate, thus making it possible to suppress, for example, forcible bending of the pressing sheet 22.

In this manner, in the present embodiment, when the user rotates the open portion 23, the guide member 26 slides in accordance with the movement of the pressing sheet 22 to the downstream side in the X direction and the rotation members 25 rotate. Thereby, it is possible to rotate the open portion 23 to open the conveyance path without changing a size of the ADF 701 in the width direction (X direction). Since the guide member 26 is arranged on the apparatus front side and is retained by the base member 24 so as to be slidable, it is possible to suppress an erroneous operation of the user by accessing an inner part of the base member 24.

As illustrated in FIGS. 5 and 6, the base member 24 is provided with a rib 24a. When the open portion 23 rotates in a counterclockwise manner, vertically upward force is applied to the pressing sheet 22 between the end 22a and the guide member 26 and the pressing sheet 22 may be bent toward the inner part of the base member 24. By providing the rib 24a as in the present embodiment, it is possible to suppress entering of the pressing sheet 22 into the inner part of the base member 24.

That is, the disclosure provides an image reading apparatus capable of opening a conveyance path of a document while suppressing increase in a size of the apparatus in a width direction.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-210531 filed Oct. 31, 2017, which is hereby incorporated by reference herein in s entirety.

What is claimed is:

1. An image reading apparatus comprising:
    a document platen on which a document is to be stacked;
    a pressing sheet having flexibility and configured to press the document against the document platen;
    a conveyance unit provided in a base member and configured to form a conveyance path within which the document is to be conveyed;
    a reading unit configured to read the document conveyed by the conveyance unit;
    an open portion provided in the base member, wherein the open portion is rotatable in a first direction with respect to the base member to open at least a part of the conveyance path and is configured to retain one end of the pressing sheet in a longitudinal direction; and
    a rotation member configured to retain the other end of the pressing sheet in the longitudinal direction and is rotatable in the first direction with respect to the base member.

2. The image reading apparatus according to claim 1,
    wherein the document platen is provided on a document platen unit,
    wherein the base member and the document platen unit are connected by a hinge, and
    wherein the base member is openable or closable with respect to the document platen unit utilizing the hinge.

3. The image reading apparatus according to claim 1, further comprising:
    a guide member provided in the pressing sheet; and
    a rail member provided in the base member and configured to retain the guide member to be slidable.

4. The image reading apparatus according to claim 3, wherein the guide member slides on the rail member in accordance with rotation of the open portion.

5. The image reading apparatus according to claim 4, wherein an area of the pressing sheet between the guide member and the other end of the pressing sheet is bent in accordance with the rotation of the open portion.

6. The image reading apparatus according to claim 3, wherein the guide member and the rail member are arranged on an apparatus front side.

7. The image reading apparatus according to claim 3, further comprising a rib provided in the base member and arranged between the open portion and the rail member, wherein the rib is configured to suppress entering of the pressing sheet into an inner part of the base member.

8. The image reading apparatus according to claim 2, wherein the rotation member is configured to retain the pressing sheet at least at two places on a first side on which the hinge is provided and at least at two places on a second side facing the first side.

9. The image reading apparatus according to claim 1, wherein the open portion forms a part of the conveyance path.

10. A recording apparatus comprising:
    a recording unit configured to record an image on a recording medium; and
    the image reading apparatus according to claim 1.

11. An image reading apparatus comprising:
    a pressing sheet having flexibility and configured to press a document against a document platen on which a document is to be stacked;
    a conveyance unit provided in a base member and configured to form a conveyance path within which the document is to be conveyed;
    a reading unit configured to read the document conveyed by the conveyance unit;
    an open portion provided in the base member, wherein the open portion is rotatable in a first direction with respect to the base member to open at least a part of the conveyance path and is configured to retain one end of the pressing sheet in a longitudinal direction; and
    a rotation member configured to retain the other end of the pressing sheet in the longitudinal direction and is rotatable in the first direction with respect to the base member.

12. A method for an image reading apparatus having a document platen on which a document is to be stacked, a pressing sheet having flexibility, a conveyance unit provided in a base member, an open portion provided in the base member and rotatable in a first direction with respect to the base member to open at least a part of the conveyance path, and a rotation member that is rotatable in the first direction with respect to the base member, the method comprising:
    pressing, via the pressing sheet, the document against the document platen;
    forming, via a conveyance unit, a conveyance path within which the document is conveyed;
    reading, via the reading unit, the document conveyed by the conveyance unit;
    retaining, via the open portion, one end of the pressing sheet in a longitudinal direction; and
    retaining, via the rotation member, the other end of the pressing sheet in the longitudinal direction.

* * * * *